Patented Feb. 8, 1949

2,461,301

UNITED STATES PATENT OFFICE 2,461,301

POLYMERIZABLE CHEMICALS

Pliny O. Tawney, Passaic, N. J., assignor to United States Rubber Company, New York, N. Y., a corporation of New Jersey No Drawing. Application May 5, 1944, Serial No. 534,322

7 Claims. (Cl. 260—80)

This invention relates to new monomeric polymerizable chemicals, as well as to their polymers, and interpolymers with other unsaturated polymerizable chemicals.

I have discovered that ortho-benzoylbenzoic acid can be reacted with allyl alcohol to form a new compound, allyl ortho-benzoylbenzoate. Moreover, I have discovered that other allylic alcohols such as methallyl alcohol will undergo this reaction to form the corresponding esters of ortho-benzoylbenzoic acid. For the preparation of these esters, I prefer to use an esterification catalyst such as para-toluenesulfonic acid or sodium ethylate, in order to increase the speed of reaction. It is understood that although I choose to prepare my new esters by the direct interaction of an allylic alcohol and ortho-benzoylbenzoic acid, any of the methods of esterification commonly used by those skilled in the art can be alternatively employed.

The allylic ortho-benzoylbenzoates are clear, viscous, high-boiling oils. These oils have various properties. They may be used as lubricants and they may also be used as plasticizers or softeners for various resins and plastics such as polymethyl methacrylate, polystyrene, etc.

Upon polymerizing allylic ortho-benzoylbenzoates, products are obtained which range from viscous, sticky oils to tough, flexible solids, and such compositions are suitable for adhesives, for impregnation of leather, textiles, etc., and for coatings.

Moreover, my new esters can be interpolymerized with one or more other compounds which contain an olefinic linkage of the type $R_1CH=CR_2R_3$, where $R_1$ stands for hydrogen, alkyl, aryl or carbalkoxy and $R_2$ stands for hydrogen, cyano, acyl, acetoxy or carbalkoxy, or where $R_1$ and $R_2$ may each stand for carbalkoxy or may together stand for the group

—CO—O—CO—

(oxydicarbonyl); and $R_3$ is hydrogen or alkyl. Examples of such compounds include maleic anhydride, esters of acrylic acids, fumaric esters, acrylonitrile, methacrylonitrile, methyl isopropenyl ketone, vinyl acetate, etc.

These interpolymers, under the influence of heat and pressure, can be extruded into filaments or molded into a variety of shapes. Such molded products are clear and tough, and possess considerable flexibility. By suitably mixing the interpolymers with plasticizers or softening agents, e. g., dibutyl phthalate, resilient rubber-like products are obtained. Fillers, pigments, etc., may be added, if desired. By dissolving the interpolymers in an appropriate solvent, e. g., acetone, the resulting solutions may be used as lacquers or film-forming materials, or for impregnation purposes.

In the polymerization and interpolymerization of allylic ortho-benzoylbenzoates, I find it expedient, with respect to economy, time of reaction, and increased yield of product, to employ a polymerization accelerator, and for this purpose peroxides such as acetyl peroxide, benzoyl peroxide, lauroyl peroxide, succinyl peroxide, t-butyl hydrogen peroxide, etc., have proven satisfactory.

The following examples illustrate the various features of my invention, and it will be obvious to those skilled in the art that the proportions of reactants may be altered within reasonable limits from those actually disclosed without departing from the essence of the invention. All parts are by weight.

Example 1

Four hundred and fifty (450) parts of ortho-benzoylbenzoic acid, 232 parts of commercial allyl alcohol, 695 parts of commercial benzene and 10 parts of para-toluenesulfonic acid are refluxed together on a steam bath for 48 hours, during which time the water formed by the esterification is removed by continuous distillation of the benzene-water azeotrope. At the end of this time, the theoretical amount of water has been removed and the heating is discontinued. The reaction mixture is neutralized with sodium bicarbonate solution and dried over anhydrous sodium sulphate. The excess allyl alcohol and benzene are then removed by distillation at atmospheric pressure, and the oily residue is then subjected to vacuum distillation.

The product is a clear, yellow, oily liquid which boils at 174–176° C. at 2 millimeters pressure, and the yield (395 parts) is 78% of the theoretical.

Analysis:
C, 77.1, 76.6%; H, 5.62, 5.42%.
Iodine number (Wijs), 94.2, 95.5.
$n^D{}_{20}=1.5818$; $d^{25}=1.155$.

The elementary analysis corresponds to the theoretical values calculated for allyl ortho-benzoylbenzoate.

Example 2

Ten (10) parts of monomeric allyl ortho-benzoylbenzoate and 0.085 part of 65% tertiary-butyl hydrogen peroxide are mixed and heated at 120° C. for 16 hours. The product is a clear, brown gum which is purified by repeatedly dissolving it in acetone and precipitating it with methanol in which the polymer is insoluble. After the precipitate is dried in vacuo with heating to remove solvents, the product is obtained as a yellow powder which softens at 50° C. and is soluble in acetone, chloroform and benzene.

Analysis:
    C, 75.2%; H, 5.35%.
    $[\eta]_0 = 0.039$ (limiting viscosity).

*Example 3*

Five (5) parts of allyl ortho-benzoylbenzoate, prepared as in Example 1, are heated together with 0.025 part of benzoyl peroxide at 75° C. for 16 hours. The clear viscous reaction product is poured into gasoline, precipitating a soft white polymer. The product is washed with several portions of gasoline to remove unreacted monomer, and then dried in vacuo to yield a product similar to that of Example 2.

*Example 4*

Six and five tenths (6.5) parts of allyl ortho-benzoylbenzoate, 4.3 parts of vinyl acetate and 0.34 part of 65% tertiary-butyl hydroperoxide are mixed and heated for 16 hours at 120° C. The product is a clear, green, viscous liquid which contains unreacted starting materials, and purification is effected by repeatedly dissolving the product in acetone and precipitating it with ligroin. After the precipitate is dried in vacuo with heating to remove solvents, the final product is obtained as a yellow powder in 27% (3 parts) of the theoretical yield.

Analysis:
    Found: C, 65.5%; H, 6.14%.
    $[\eta]_0 = 0.07$

The analysis corresponds to a copolymer containing approximately 47.5% by weight of allyl ortho-benzoylbenzoate and 52.5% of vinyl acetate, corresponding to a molar ratio of 1:3.4. The copolymer softens at 45° C. and melts at 100° C. It is soluble in acetone, acetic acid, chloroform, benzene, and ethyl acetate, and insoluble in ethanol and ligroin.

*Example 5*

Six and five tenths (6.5) parts of allyl ortho-benzoylbenzoate, 4.9 parts of maleic anhydride and 0.34 part of 65% tertiary-butyl hydrogen peroxide are mixed and heated for 10 hours at 120° C. The product is a clear, green gum which is purified by repeatedly dissolving it in acetone and precipitating it with methanol. It is then washed thoroughly with several portions of ligroin, and dried in vacuo, 9.0 parts (79% of theory) of a white powder being obtained which softens at 40° C. and melts at 135° C.

Analysis:
    Found: C, 65.2, 65.2%; H, 4.72, 4.79%.

The analysis indicates that a copolymer containing substantial amounts of both ingredients has been formed.

*Example 6*

Thirteen (13) parts of allyl ortho-benzoylbenzoate are mixed with 5.3 parts of acrylonitrile and 0.34 part of 65% tertiary-butyl hydrogen peroxide, and the mixture is heated for 16 hours at 120° C. The product is a brown solid, which is washed thoroughly with several portions of benzene and acetone to remove all unreacted starting materials. After the precipitate is dried in vacuo, with heating, 11.0 parts (60% of theory) of finely divided yellow powder are obtained.

Analysis:
    Found: C, 71.0, 71.1%; H, 5.62, 5.65%;
        N, 15.1, 15.1%.

The analysis indicates a copolymer containing approximately 63.4% of acrylonitrile and 36.6% of allyl ortho-benzoylbenzoate, the molar ratio being 8.65:1.

*Example 7*

Three (3) parts of allyl ortho-benzoylbenzoate, 7.0 parts of methyl isopropenyl ketone and 0.1 part of benzoyl peroxide are mixed and heated at 75° C. for 168 hours. The gummy reaction product is purified by repeatedly dissolving it in acetone and precipitating with methanol. After the precipitate is dried in vacuo, 3.8 parts (38% of theory) of brown powder are obtained.

Analysis:
    Found: C, 75.6, 75.3%; H, 5.93, 5.96%.
    $[\eta]_0 = 0.102$

The analysis indicates a copolymer containing approximately 85.0% of allyl ortho-benzoylbenzoate and 15.0% of methyl isopropenyl ketone, the molar ratio being 1.8:1.0.

*Example 8*

Thirteen (13) parts of allyl ortho-benzoylbenzoate, 10.0 parts of methyl methacrylate and 0.34 part of tertiary-butyl hydroperoxide are mixed and heated for 16 hours at 120° C. The product is a clear, colorless casting which is purified by repeatedly dissolving it in acetone and precipitating with ligroin. After drying in vacuo, with heating, 12 parts (54.5% of theory) of a tough white solid are obtained. The product is quite rubbery at 45° C. and does not melt below 200° C.

Analysis:
    C, 65.4%; H, 7.59%.

The analysis corresponds to a copolymer containing approximately 67.5% of methyl methacrylate and 32.5% of allyl ortho-benzoylbenzoate, the molar ratio being 5.5:1.

*Example 9*

Methallyl ortho-benzoylbenzoate is prepared by heating a mixture of 400 parts of methyl ortho-benzoylbenzoate with 450 parts of methallyl alcohol, in the presence of 25 parts of a 5% solution of sodium ethylate in ethanol as an esterification catalyst and 1.0 part of tertiary-butyl catechol as a polymerization inhibitor. The mixture is refluxed for 14 hours during which the methanol formed in the alcohol interchange reaction is removed by distillation through an efficient fractionating column.

At the end of the reaction, the methallyl ortho-benzoylbenzoate formed is recovered by repeated extraction of the reaction mixture with diethyl ether. The ether extracts are combined, washed with water until neutral and then dried over anhydrous sodium sulfate. The ether is then evaporated and the residue is fractionally distilled under reduced pressure to yield 379 parts (81.5% of theory) of methallyl ortho-benzoylbenzoate, a clear viscous oil, boiling at 178-179.5 at 2.5 mm.

Analysis:
Found: C, 77.34, 77.15%; H, 5.76, 5.79%; Iodine number, 92.2, 91.9;
(Calculated for $C_{18}H_{17}O_3$: C, 76.8%; H, 6.1%)

Density $(d_{20}^{20}) = 1.353$

Index of refraction, $[n]^D_{20} = 1.5763$

The analytical data agree with the theoretical values calculated for methallyl ortho-benzoylbenzoate.

Methallyl ortho-benzoylbenzoate can be polymerized and copolymerized in the same fashion as set forth in the preceding examples for allyl ortho-benzoylbenzoate, to yield products of equal utility.

Heretofore, in order to prepare synthetic resinous materials of sufficient flexibility for industrial applications, it has been necessary, in many cases, to admix suitable plasticizers or softening agents with the polymers or interpolymers. Such products suffered from the disadvantage that the plasticizer, being only mechanically mixed with the polymeric material, was gradually extracted by solvents, by evaporation at elevated temperatures, or by climatic "weathering," with a resultant embrittlement of the polymer and a consequent decrease in the useful life of the articles manufactured therefrom.

Such difficulties can be obviated by interpolymerizing various monomers, as above, with my new ester, allyl ortho-benzoylbenzoate. In the copolymers the ortho-benzoylbenzoate groups, attached to the allyl units of the resulting interpolymer chain, function as an "internal plasticizer." The flexibility of the products does not decrease with age since the plasticizing agent is an integral part of the polymer, an actual chemical combination rather than a mechanical mixture.

Having thus described my invention, what I claim and desire to protect by Letters Patent is:
1. The allyl ester of ortho-benzoylbenzoic acid.
2. The methallyl ester of ortho-benzoylbenzoic acid.
3. A polymerizate obtained by polymerization of the allyl ester of ortho-benzoylbenzoic acid.
4. A polymerizate obtained by interpolymerization of an appreciable proportion of the allyl ester of ortho-benzoylbenzoic acid with a different polymerizable mono-olefinically unsaturated compound.
5. A polymerizable chemical having the formula

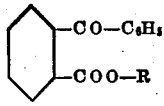

where R is selected from the class consisting of allyl and methallyl radicals.
6. A flexible polymer obtained by polymerization of an ester of orthobenzoylbenzoic acid selected from the class consisting of the allyl and methallyl esters.
7. A flexible copolymer of an appreciable proportion of an ester of orthobenzoylbenzoic acid selected from the class consisting of the allyl and methallyl esters, and a different polymerizable mono-olefinically unsaturated compound.

PLINY O. TAWNEY.

REFERENCES CITED

The following references are of record in the file of this patent:

UNITED STATES PATENTS

| Number | Name | Date |
| --- | --- | --- |
| 2,164,188 | Groll | June 27, 1939 |
| 2,213,783 | Kyrides | Sept. 3, 1940 |
| 2,332,900 | D'Alelio | Oct. 26, 1943 |
| 2,374,081 | Tattershall | Apr. 17, 1945 |
| 2,402,484 | Adelson | June 18, 1946 |